US010447653B2

United States Patent
Holtmanns et al.

(10) Patent No.: US 10,447,653 B2
(45) Date of Patent: Oct. 15, 2019

(54) TRUSTED ROUTING BETWEEN COMMUNICATION NETWORK SYSTEMS

(71) Applicant: NOKIA SOLUTIONS AND NETWORKS OY, Espoo (FI)

(72) Inventors: Silke Holtmanns, Klaukkala (FI); Ian Justin Oliver, Söderkulla (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 89 days.

(21) Appl. No.: 15/537,001

(22) PCT Filed: Dec. 18, 2014

(86) PCT No.: PCT/EP2014/078354
§ 371 (c)(1),
(2) Date: Jun. 16, 2017

(87) PCT Pub. No.: WO2016/096005
PCT Pub. Date: Jun. 23, 2016

(65) Prior Publication Data
US 2017/0353430 A1    Dec. 7, 2017

(51) Int. Cl.
*H04L 29/06* (2006.01)
*H04L 12/751* (2013.01)
(Continued)

(52) U.S. Cl.
CPC .......... *H04L 63/0209* (2013.01); *H04L 45/02* (2013.01); *H04L 45/12* (2013.01);
(Continued)

(58) Field of Classification Search
CPC ..... H04L 63/0209; H04L 45/02; H04L 45/12; H04L 63/12; H04L 63/123; H04L 63/18; H04L 67/145; H04L 12/66
See application file for complete search history.

(56) References Cited

U.S. PATENT DOCUMENTS 7,174,018 B1 * 2/2007 Patil .................... H04L 63/0442
380/258
7,969,865 B2 * 6/2011 Nonaka .................... H04L 45/22
370/216
(Continued)

FOREIGN PATENT DOCUMENTS

| JP | 05227162 A | 9/1993 |
|---|---|---|
| WO | WO 2004/045133 A1 | 5/2004 |
| WO | 2013115943 A1 | 8/2013 |

OTHER PUBLICATIONS

International Search Report & Written Opinion dated May 19, 2015 corresponding to International Patent Application No. PCT/EP2014/078354.
(Continued)

*Primary Examiner* — Ghodrat Jamshidi
(74) *Attorney, Agent, or Firm* — Squire Patton Boggs (US) LLP

(57) ABSTRACT

An apparatus of a communication network system, which routes data packets and stores trusted routes between different communication network systems in a database, detects (S12) that a data packet requires a route with a specific level of trust, determines (S13), from the trusted routes stored in the database, a specific trusted route towards a destination as indicated in the data packet, and sets (S15) the data packet on the specific trusted route towards the destination.

19 Claims, 5 Drawing Sheets

(51) Int. Cl.
H04L 12/721 (2013.01)
H04L 29/08 (2006.01)
H04L 12/66 (2006.01)

(52) U.S. Cl.
CPC .......... H04L 63/12 (2013.01); H04L 63/123 (2013.01); H04L 63/18 (2013.01); H04L 67/145 (2013.01); H04L 12/66 (2013.01)

(56) References Cited

U.S. PATENT DOCUMENTS

| | | | | |
|---|---|---|---|---|
| 7,991,895 | B2* | 8/2011 | Leppisaari | H04L 67/306 709/227 |
| 8,451,750 | B2 | 5/2013 | Ward et al. | |
| 8,914,538 | B2* | 12/2014 | Byers | G06F 13/4022 709/237 |
| 9,154,949 | B1* | 10/2015 | Bertz | H04W 12/06 |
| 2007/0133406 | A1* | 6/2007 | Vasseur | H04L 45/02 370/230 |
| 2007/0180495 | A1* | 8/2007 | Hardjono | H04L 63/0823 726/3 |
| 2008/0144644 | A1* | 6/2008 | Allan | H04L 12/462 370/401 |
| 2009/0252161 | A1* | 10/2009 | Morris | H04L 45/124 370/389 |
| 2010/0002722 | A1* | 1/2010 | Porat | H04L 45/02 370/467 |
| 2010/0031019 | A1 | 2/2010 | Manning et al. | |
| 2010/0061257 | A1* | 3/2010 | Kitawaki | H04L 41/0853 370/252 |
| 2012/0167160 | A1* | 6/2012 | Carney | H04L 45/02 726/1 |
| 2013/0019317 | A1* | 1/2013 | Whelan | H04B 7/18593 726/26 |
| 2013/0115943 | A1 | 5/2013 | Hongwei et al. | |
| 2015/0131480 | A1* | 5/2015 | Nishimoto | H04W 40/12 370/254 |
| 2016/0127219 | A1* | 5/2016 | Akhavain Mohammadi | H04L 45/02 709/224 |

OTHER PUBLICATIONS

Y. Rekhter et al., "A Border Gateway Protocol 4 (BGP-4)," Network Working Group, RFC 4271, Jan. 2006, 104 pages.

S. Murphy, "BGP Security Vulnerabilities Analysis," Network Working Group, RFC 4272, Jan. 2006, 22 pages.

T. Bates et al., "Multiprotocol Extensions for BGP-4," Network Working Group, RFC 4760, Jan. 2007, 12 pages.

M. Lepinski et al., "An Infrastructure to Support Secure Internet Routing," Internet Engineering Task Force (IETF), RFC 6480, Feb. 2012, 24 pages.

G. Huston et al., "Validation of Route Origination Using the Resource Certificate Public Key Infrastructure (PKI) and Route Origin Authorizations (ROAs)," Internet Engineering Task Force (IETF), RFC 6483, Feb. 2012, 8 pages.

http://docwiki.cisco.com/wiki/Border_Gateway_Protocol, Border Gateway Protocol, Wikipedia, 9 pages.

http://searchsdn.techtarget.com/feature/Border-Gateway-Protocol-as-a-hybrid-SDN-protocol; Border Gateway Protocol as a hybrid SDN protocol; May 2013, 5 pages.

M. Lepinski et al.; Network Working Group, Internet Draft, "An Overview of BGPSEC draft-ietf-sidr-bgpsec-overview-05;" Jul. 4, 2014, 10 pages.

http://www.cisco.com/c/en/us/support/docs/security/asa-5500-x-series-next-generation-firewalls/118050-config-bgp-00.html; ASA Border Gateway Protocol Configuration Example; Cisco; Aug. 11, 2014, 9 pages.

https://www.eff.org/files/2014/01/06/20131230-appelbaum-nsa_ant_catalog.pdf; DEITYBOUNCE, ANT Product Data, Jun. 20, 2008, 48 pages.

http://www.juniper.net/techpubs/en_US/junos13.1/information-products/pathway-pages/config-guide-routing/config-guide-routing-bgp.html; BGP Configuration Guide.

http://www.bgp4.as/security; BGP Security, ISP Core Security Resources.

Oct. 1, 2018 Office Action issued in Japanese Patent Application No. 2017-533284.

Oct. 30, 2018 Office Action issued in Korean Patent Application No. 10-2017-7019545.

Juniper Networks, WANDL Router Feature Guide for NPAT and IP/MPLS View, Release 6.1.0, May 2, 2014, http://www.juniper.net/documentation/en_US/ip-mplsview6.1.0/information-products/topic-collections/ip-mplsview-routers.pdf.

Office Action issued in corresponding Japanese Patent Application No. 2017-533284 dated May 13, 2019.

* cited by examiner 12,653 B2

TRUSTED ROUTING BETWEEN COMMUNICATION NETWORK SYSTEMS

BACKGROUND OF THE INVENTION

Field of the Invention

The present invention relates to trusted routing between communication network systems, e.g. boarder gateway protocols (BGPs).

Related Background Art

When the Internet was built, then it was assumed that there would be just a few trustworthy players and no special security and trust measures were taken to secure routing, in particular routing tables and usage of BGP (Border Gateway Protocol).

However, nowadays incoming routing tables to a BGP might be "fine-tuned" to trick a gateway into sending information to an entity that may then break the confidentiality and sniff into packets. These kinds of attacks have taken place quite often in practice. BGP offers some possibilities for security, but how to handle those, in particular not only with the next peer, but for the whole path of a communication is not yet fully solved.

Further, legacy BGs have to be handled and also it is assumed that a decision making BG has to have all (root) certificates of potential in-route gateways, which in practice might turn out very difficult to the scale of the network.

Some operators might like to offer security as a service to their prime business customers, i.e. security as a value added service, but this requires that the communication is not re-routed via some less-trustworthy node with big computing power.

In addition, some countries have developed or have the intention to develop legislations not to route traffic outside of what they consider a trustworthy domain. This is called local routing and examples are Schengen-routing and Russian routing.

Also a trend to use BGP as a foundation for Software Defined Networks (SDN) might endanger the whole SDN-based network topology.

The following meanings for the abbreviations used in this specification apply:
AS Autonomous System
BG Border Gateway
BGP Border Gateway Protocol
CMS Cryptographic Message Syntax
MED Multi-Exist Discriminators
NFV Network Functions Virtualization
NRLI Network Layer Reachability
PKI Public Key Infrastructure
RIB Routing Information Base
SDN Software Defined Networks

SUMMARY OF THE INVENTION

The present invention aims at solving at least one of the above-described drawbacks.

For example, at least one embodiment of the invention aims at providing a trusted path between an AS and a final recipients' AS, taking into account a mix of different BGP deployments and old and new types of GBP nodes.

This is at least in part achieved by the method, apparatus and computer program product as defined in the appended claims.

In the following the invention will be described by way of embodiments thereof with reference to the accompanying drawings.

DESCRIPTION OF THE EMBODIMENTS

Figure 1:
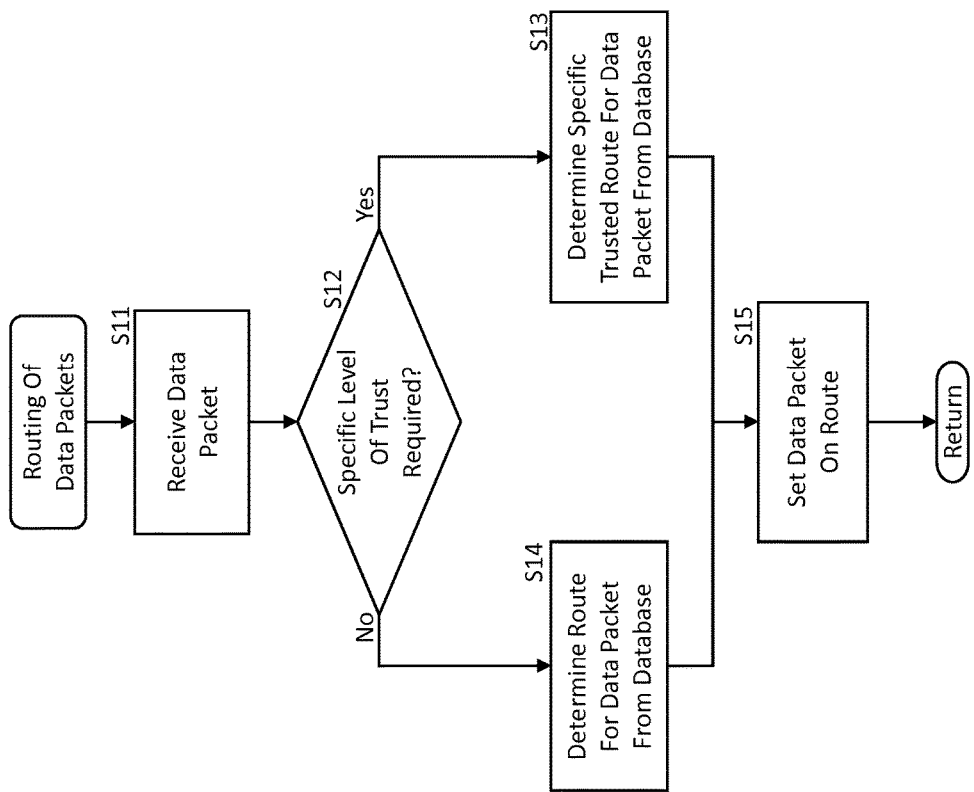
FIG. 1 shows a flowchart illustrating a process of routing data packets according to an embodiment of the invention.

A Border Gateway Protocol (BGP) is an inter-Autonomous System routing protocol used e.g. between large communication network providers. A primary function of a BGP system is to exchange network reachability information with other BGP systems. This network reachability information includes information on the list of Autonomous Systems (ASes) that reachability information traverses. This information is sufficient for constructing a graph of AS connectivity for this reachability, from which routing loops may be pruned and, at the AS level, some policy decisions may be enforced. Those policy decisions are focused on efficiency i.e. shortest path to destination.

BGP differentiates between routing within the Autonomous System (one trust domain), i.e. interior/internal BGB (iBGP), and normal (external) BGP between ASs. For iBGP it is assumed that iBGs run in a full mesh, i.e. routers "know each other well".

Filtering routes learned from BG peers, their transformation before redistribution to the next BG peers or before setting them into a routing table are typically controlled via a route-maps mechanism.

The route-maps mechanism represents basically rules which allow to apply certain actions to routes matching certain criteria on either ingress or egress path. These rules can specify that the route is to be dropped or, alternatively, its attributes are to be modified. It is usually the responsibility of an AS administrator to provide a desired route-map configuration on a router supporting BGP. According to at least one embodiment of the invention, additions are provided to the BGP for trusted routing by using an architecture for an infrastructure to support improved security of Internet routing. The foundation of this architecture is a Resource Public Key Infrastructure (RPKI) that represents the allocation hierarchy of IP address space and Autonomous System (AS) numbers, and a distributed repository system for storing and disseminating the data objects that comprise the RPKI, as well as other signed objects necessary for improved routing security. However, in contrast to at least one embodiment of the invention, the RPKI does not take into account different deployment speeds.

In order to provide a chain of trusted BGs to hop along, a net of trust is needed. It is known that based on the geography of the BG, packets can be prevented from going there. According to at least one embodiment of the invention, that mechanism is made "trustworthy" and takes into account that not all network nodes in the world will be updated "over night".

Each BGP maintains its own master routing table called LocRIB (RIB=Routing Information Base). For each BG neighbor (also called peer), the BGP process maintains a conceptual Adj-RIB-In (Adjacent Routing Information Base, Incoming, mostly the non-processed routing information is stored here) containing an NLRI received from the neighbor, and a conceptual Adj-RIB-Out (Outgoing) for NLRI to be sent to the neighbor. Today, without any consideration on trustworthiness of neighbors, after processing, all routing information is stored in the LocRIB of the BGP.

An ROA (Route Origin Authorization) constitutes an explicit authorization for a single AS to originate routes to one or more prefixes, and is signed by the holder of those prefixes.

According to an aspect of the invention, chaining of trust of routing tables (routing table updates) is provided. Today PKI ensures that information on a next hop can be trusted, but it is not ensured that the next hop really uses trustworthy information for further routing. According to at least one embodiment of the invention, the PKI mechanism can be improved to be used to create a web of trust e.g. between respectable security conscious operators.

According to a further aspect of the invention, a backwards compatible routing decision mechanism based on trust and geographical attributes, e.g. in combination with existing routing decision factors and an ROA approach, is provided. LocRIB is extended with a geographical and trust attribute.

Now reference is made to FIG. 1 which shows a flowchart illustrating a routing process according to an embodiment of the invention. The process may be implemented by an apparatus (e.g. a BG, router, gateway, peer) of a communication network system (e.g. an AS), which routes data packets and stores trusted routes between different communication network systems in a database (e.g. a routing table, LocRIP). It is to be noted that the idea of the present invention is not limited to BGP routers, but can also applied for other routers, such as e.g. NFV routers.

In step S11, a data packet is received at the apparatus. In step S12 it is checked whether or not the data packet requires a route with a specific level of trust. In case it is detected in step S12 that the data packet requires a route with a specific level of trust, in step S13 it is determined, from the trusted routes stored in the database, a specific trusted route towards a destination as indicated in the data packet.

Otherwise, in case it is detected in step S12 that the data packet does not require a route with a specific level of trust, in step S14 a route is determined from the database without taking into account any specific trusted route does not have to be selected from the database.

In step S15, the data packet is set on the specific trusted route or the route determined in step S14 towards the destination as indicated in the data packet.

The above-mentioned specific trusted route includes fully trusted and semi-trusted routes. For example, if the route is completely inside Germany it is considered trusted, if it is via Schengen region it would be semi-trusted, and outside Schengen region untrusted.

As will be described in more detail later on, according to an embodiment of the invention, the apparatus of the communication network system receives, from another communication network system, security information (e.g. a certificate) of the other communication network system, and stores the security information in the database.

Further, the apparatus sends, to the other communication network system, security information (e.g. a certificate) of the communication network system.

According to an implementation example of the invention to be described later on, the security information is communicated in an open message in response to an establishment of a connection between the communication network system and the other communication network system, or the security information is communicated in an update message which transfers information on reachability between communication network systems.

As will be described in more detail later on, according to an embodiment of the invention, the apparatus of the communication network system receives an update message from the other communication network system, which transfers information on reachability between communication network systems, the update message including first path information (e.g. in a path attribute ORIGIN) from the other communication network system, that indicates whether or not a path between nodes of different communication network systems, through which routing information carried in the update message has passed, has been validated.

As will be described in more detail later on, according to an embodiment of the invention, the apparatus of the communication network system checks whether or not the update message is signed with a key complying with the security information sent to the other communication network system. In case the checking result is negative, the update message may be discarded.

According to an implementation example of the invention to be described later on, the update message contains at least one of the following:

second path information (e.g. in a path attribute AS_Path) on trustworthiness between the nodes, third path information (e.g. in a path attribute NEXT_HOP) defining an address of a router to be used as a next hop to the nodes, and fourth path information (e.g. a "local attribute") defining local routing conditions.

The apparatus, in case the update message is not discarded, updates the trusted routes stored in the database based on at least one of the first, second, third and fourth path information.

As will be described in more detail later on, according to an embodiment of the invention, the apparatus exchanges keep alive messages with the different communication network systems.

Further, at least one of the open message, the update message and the keep alive message may be integrity protected and signed, or individual fields of the respective message and the integrity protected message may be signed.

According to an implementation example of the invention to be described later on, the apparatus includes at least one of the following information into an update message which transfers information on reachability between communication network systems:

first path information (e.g. in a path attribute ORIGIN), the first path information indicating whether or not a path between nodes of different communication network systems, through which routing information carried in the update message has passed, has been validated, second path information (e.g. in a path attribute AS_Path) on trustworthiness between the nodes, third path information (e.g. in a path attribute NEXT_HOP) defining an address of a router to be used as a next hop to the nodes, and fourth path information (e.g. a "local attribute") defining local routing conditions.

The address of the router may be defined based on local routing conditions.

The apparatus sends the update message towards the other communication network system.

As will be described in more detail later on, according to an embodiment of the invention, the apparatus signs the update message with a key complying with the security information received from the other communication network system.

As a preliminary matter before exploring details of various implementations, reference is made to FIG. 1 for illustrating a simplified block diagram of a control unit 20 suitable for use in practicing the exemplary embodiments of this invention.

The control unit 20 comprises processing resources (e.g. processing circuitry) 21, memory resources (e.g. memory circuitry) 22 and interfaces (e.g. interface circuitry) 23 which are coupled via a link 24. The control unit 20 may part of and/or used by the above-described apparatus. For sending and receiving data packets to and from peers of the apparatus, which comprise the above-described other communication network system or different communication network system, a connection 25 is used. Further, for sending and receiving messages, such as the open, update and keep alive messages, to and from peers of the apparatus, which comprise the above-described other communication network system or different communication network system, a connection 26 is used.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

In general, the exemplary embodiments of this invention may be implemented by computer software stored in the memory resources 22 and executable by the processing resources 21, or by hardware, or by a combination of software and/or firmware and hardware.

The memory resources 22 may be of any type suitable to the local technical environment and may be implemented using any suitable data storage technology, such as semiconductor-based memory devices, magnetic memory devices and systems, optical memory devices and systems, fixed memory and removable memory. The processing resources 21 may be of any type suitable to the local technical environment, and may include one or more of general purpose computers, special purpose computers, microprocessors, digital signal processors (DSPs) and processors based on a multi-core processor architecture, as non-limiting examples.

According to at least one embodiment of the invention, two entities, e.g. routers, communicate by sending messages which contain information about routing, keys etc.

A message, however, will be carried by one or more data packets depending upon the protocol used.

Some protocols have notion of ordering of packets so that a complete message might be reconstructed and missing packets detected and resent. This also allows the packets to arrive out of order, too, as the total number of expected packets is always known because this information is contained in all individual packets.

Some protocols also contain notion of error correction which not only allows the integrity of the message to be preserved in a "noisy" environment but also detection and recovery of errors. It is possible here that messages containing errors be corrected without the need for a request to retransmit.

Furthermore, some protocols can carry other protocols—this is how 'tunneling" is made. So while a system might block BGP messages and the BGP carrier protocol, this could be carried further by a protocol that is allowed, e.g. BGP over HTTP might be one solution in some systems. This is an example of how this might be achieved. Certain kinds of point to point security can be achieved by this mechanism, too.

Furthermore, the absence of a message or data packet containing a message, or even data packets themselves, can also be interpreted as a 'message'. This occurs typically during network failure of some kind and packets do not arrive at their destination within a given period of time causing a time-out. Under such circumstances the receiver might reissue a request for missing packets, fail or some other suitable operation, including waiting.

In other words, a BGP message is carried by the BGP protocol, which may be spread over one or more data packets as the underlying transport protocols require.

A BGP message carried by the BGP protocol can be carried by any underlying protocol that can carry data in any form.

A BGP message not received is indicative of some kind of network error, and as such non-receipt in a situation where receipt is expected is a 'message'. In this situation this can cause some kind of processing to deal with such failure, e.g. locking of certain routes or configurations, change of system model to a more 'alert' configuration, or less trusting state, etc.

Further, a BGP message may be sent over two or more protocols simultaneously.

For example, the exchange of BGP keys might be facilitated by messages over one protocol designed for key exchange, while the BGP routing messages might be facilitated by the BGP protocol or any combination of carrier protocols as described above.

Furthermore, it is even possible that theoretically any combinations of protocols be used to transport BGP messages including the BGP protocol itself.

In the following, an implementation example of the invention will be described.

Part 1: Modification of BGP to Improve Trustworthiness of Routing Information

BGP comprises the following messages modified to improve the security of BGP routing:

Open Messages
Update Messages
Keep Alive Messages

In the following, an example of modifying those messages will be described.

Open Message

Figure 3:
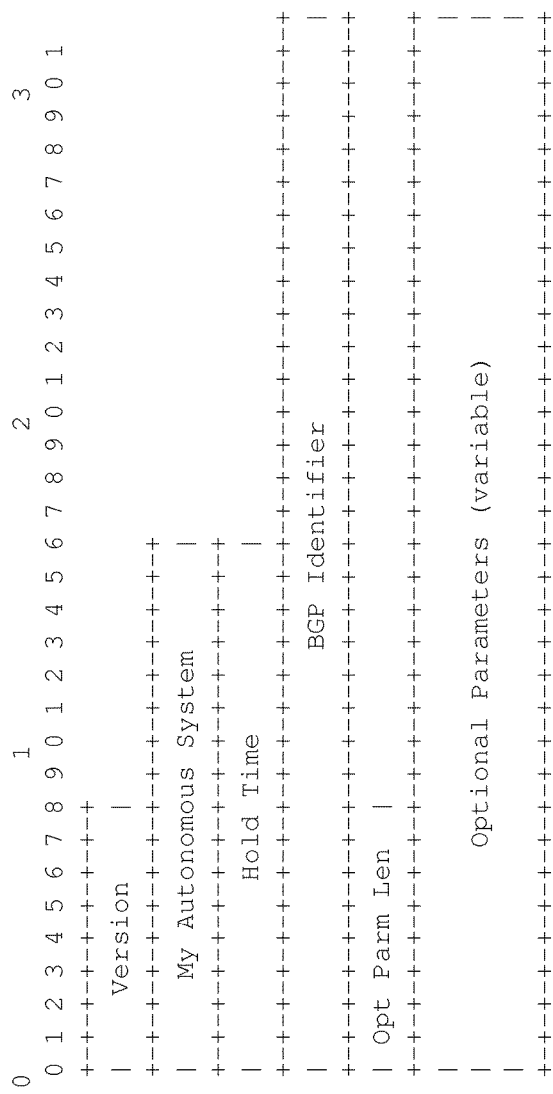
FIG. 3 shows a configuration of an open message according to an implementation example of the invention, where new information is placed in an optional parameter section, along with other optional parameters.

As can be seen from FIG. 3, in addition to a fixed-size BGP header, a BGP Open Message contains the following fields:

BGP protocol Version (currently v4)

Local AS number (logical system name)

Hold time (proposed hold time value, needed for keep-alive purposes)

BGP identifier (IP address of the logical BGP system)

In this field also router Id statements can be added under the routing options. The IP address of the first interface found is the default address.

Optional Parameter field length and parameter.

According to the implementation example of the invention, the optional parameter field illustrated in FIG. 3 is used to provide AS security information. That is, the Open message is hashed and signed e.g. using CMS (cryptographic message syntax), and a certificate is attached to the optional parameter field.

Update Message

A BGP Update Message is used to transfer routing information between BGP peers. The information in the update message can be used to construct a graph that describes relationships of various Autonomous Systems. The update message is to send around information on reachability.

Figure 4:
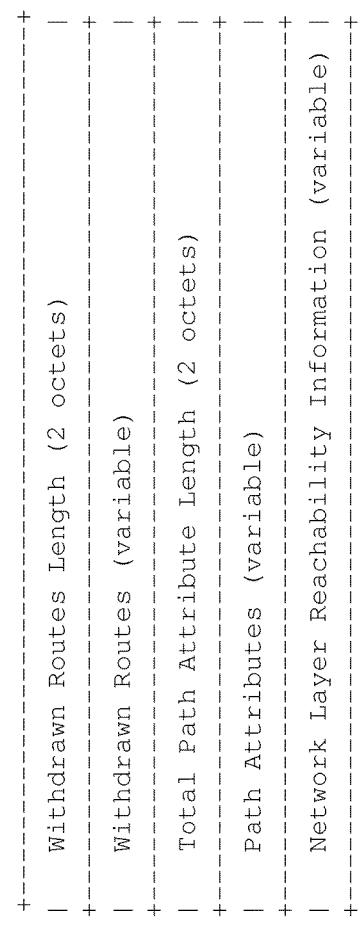
FIG. 4 shows a configuration of an update message according to an implementation example of the invention, where new information is put into path attributes and/or Network Layer Reachability Information.

As can be seen from FIG. 4, the update message is constructed as follows:

Unfeasible route length (length of the withdrawn routes field)

Withdrawn routes (sort of revocation list for nodes no longer reachable)

Total path attribute length (length of the path attribute field, this lists the path attributes for a feasible route to a destination)

Path attributes—Properties of the routes, including path origin, multiple exit discriminator (MED), originating system's preference for the route, and information about aggregation, communities, confederations, and route reflection Network layer reachability information (NLRI) (IP address prefixes of feasible routes being advertised in the update message). Here it has to be ensured that this information is really trustworthy.

According to an implementation example of the invention, the update message is signed and hashed as a whole (e.g. using CMS) to avoid manipulation on the way to trick a gateway (BG) into thinking that only "one option" is left to route data packets.

Path Attributes:

ORIGIN (Type Code 1): ORIGIN is a well-known mandatory attribute that defines the origin of the path information. The data octet can assume the following values (note that 3, 4 and 5 are values introduced according to the implementation example of the invention):

| Value | Meaning |
|---|---|
| 0 | IGP - Network Layer Reachability Information is interior to the originating AS |
| 1 | EGP - Network Layer Reachability Information learned via EGP protocol |
| 2 | INCOMPLETE - Network Layer Reachability |
| 3 | NEW Information learned by some other means |
| 4 | NEW Path could be fully validated by peer node (AS) |
| 5 | NEW Path could only be partially/not validated by peer node (AS) |

If the values 4 and 5 are set, then the whole message needs to be signed with the key belonging to the certificate received in the open message (or as an IP variant: with the certificate received with the Update message).

AS_Path

AS_PATH is a mandatory attribute. This attribute identifies the autonomous systems through which routing information carried in this UPDATE message has passed. The components of this list can be AS_SETs or AS_SEQUENCEs.

According to an implementation example of the invention, the AS_Path information are hashed and signed. Just signing the whole message does not work for the AS_Path, since the AS_Path information might be forwarded and re-used and the original signature need to be kept, so that also the nodes "further down in the route" know the information is trustworthy.

For example, the whole AS_Path attribute is signed (or the hash thereof is signed) or that all attributes (or the hash thereof) is signed with the key belonging to the AS sending this information. The AS_Path may also contain information on the trustworthiness of each hop, i.e. a signature of that part of the table. Example:

IP of AS_1

IP of AS_2

IP of AS_3

IP of AS_4

Signature on whole by AS_1; this is mandatory, but can also be done on message level. However, then the information is not reusable for forwarding.

Signature of AS_3 on AS_3 and AS_4 with info which fields are signed.

This is to be interpreted as follows:

AS_1 could verify the origin of the next hop (AS_2) and that it got the information on AS_3 and AS_4 from AS_2. AS_2 could not vouch for the information received from AS_3, but AS_3 could vouch for AS_4. In this example, the trust chain is broken and this routing table would have an Origin value of 5, because not the full table (i.e. route) could be validated and chained.

If there would be a signature from AS_2 on AS_3 and AS_4, then the chain would be complete and the route would be regarded as trustworthy.

Geographical routing can also be provided through the trust network of keys, or in combination with keys and known values for geographical regions. This information is encoded into a BGP packet as explained below.

Since the IP address has a regional binding, this also results in a geographical binding. For regional routing, the above-described certificate should be geographically limited. The usage of proxies (e.g. like is done for some internet services to circumvent country restrictions) is not working, since the proxy would not be issued with such a certificate/key.

It is to be noted that in this document there are two concepts of local. One means inside an AS and another one according to trust areas between countries/regions.

NEXT_HOP

The NEXT_HOP is a mandatory path attribute that defines an IP address of a router that should be used as the next hop to destinations listed in the UPDATE message.

In the following it will be described how to construct the NEXT_HOP attribute.

For sending the update message to an internal peer, the attribute is taken as is (assuming that the origin of the information was regarded as trustworthy) and the own (i.e. the sending router's) IP address/Interface address is added.

Further, the update message is signed to ensure that the origin is correct and no modification took place. In addition, the local attribute as described above may be added.

For sending the update message to an external peer:

One IP hop away and a received update message containing at least one route was regarded as trustworthy, then the own (i.e. the sending router's) address/interface address is added and the update message is signed. If the received update message was not regarded trustworthy, then either security information is stripped off (e.g. for performance reasons) or existing trust information is forwarded. Again the own (i.e. the sending router's) IP address is marked as trustworthy by signature(s).

Multiple IP hops away (multihop EBGP). Same rules for signature and addition apply.

The normal rules to avoid loops etc. apply.

The update message as a whole is signed by AS_1 (i.e. the origin of the update message, speaker) e.g. using CMS and X.509 certificates for verification & corresponding keys for signature.

Keep Alive Messages

BGP systems exchange keep alive messages to determine whether a link or host has failed or is no longer available. Keep alive messages are exchanged often enough so that the hold timer does not expire. These messages consist currently only of the BGP header.

According to an implementation example of the invention, these messages are hashed (integrity protected) and signed and optionally include a timestamp to avoid replay attacks, i.e. somebody breaks the peer and sends keep alive messages so that other nodes will still trust this peer.

Part 2: Processing in the BG

It is assumed that the BG receives "classical" BGP messages (i.e. without security enhancements), but also security enhanced BGP messages.

Regarding data packet handling, it is assumed that the BG receives a data packet and that this data packet requires a route with a specific level of trust, e.g. should be "routed trustworthily" or "Verified Schengen-routed" or similar. According to at least one implementation example of the invention, this can either be done by a special node of an AS, i.e. all data packets that come from the special node require a route with a specific level of trust, or a flag is included in a message carried by one or more data packets depending upon the protocol used, the message then at least needing integrity and origin protection, or by checking the source of the message, e.g. Sending IMEI belongs to Germany, therefore verified Schengen routing will be used. For compatibility, according to an implementation example of the invention, some sort of flag is added or already available at the packet, so that the next node recognizes that this packet requires special handling. For example, such flag is added to the header of the message.

According to the prior art, the NEXT_HOP attribute is chosen such that the shortest available path will be taken. A BGP speaker must be able to support a disabling advertisement of third party NEXT_HOP attributes in order to handle imperfectly bridged media.

The above prior art focuses on efficiency and shortest path. According to at least one embodiment of the invention this approach is kept, but only if the data packet does not require to be routed trustworthily.

When a data packet is required to be routed trustworthily, then only routes are considered that have a fully trustworthy path to the destination. If a trustworthy route could not be found, then either an error is returned to the sender (with the option to resend the data packet via a non-trusted path, or modify the message) or the message if forwarded to an untrusted route (not recommended) and the message is marked (and signed, to avoid that this mark is removed) as potentially compromised. When no fully trustworthy path is available, then a partial trustworthy path might be chosen over a fully non-trustworthy path, but that depends on the policy and configuration of the AS.

In detail, the immediate next-hop address is determined by performing a recursive route lookup operation for the IP address in the NEXT_HOP attribute, using the contents of the Routing Table, selecting one entry if multiple entries of equal trust exist.

With respect to a database of the BGP, according to at least one implementation example of the invention, the BGP either maintains trusted and non-trusted routes in the LocRIB with additional trust attributes (e.g. path signatures and a marker if the full path is trustworthy, see details on path attributes). Alternatively, a separate "trusted routes" TrustLocRIB is maintained, where only trusted routes are stored, i.e. incoming route information NLRI (Network Layer Reachability Information). From the list of trusted routes, actually the shortest/fastest can be chosen. If the full path is not trustworthy, but only part of it could be verified, then it should not go to the trusted routes (or be marked as fully trustworthy). Nevertheless, for partially trusted routes, the trust attributes (i.e. signatures) can be kept to provide "best effort trust" routing, i.e. routing as trusted as possible. The same applies for Adj-RIB-In, Adj-RIB-Out.

Figure 5:
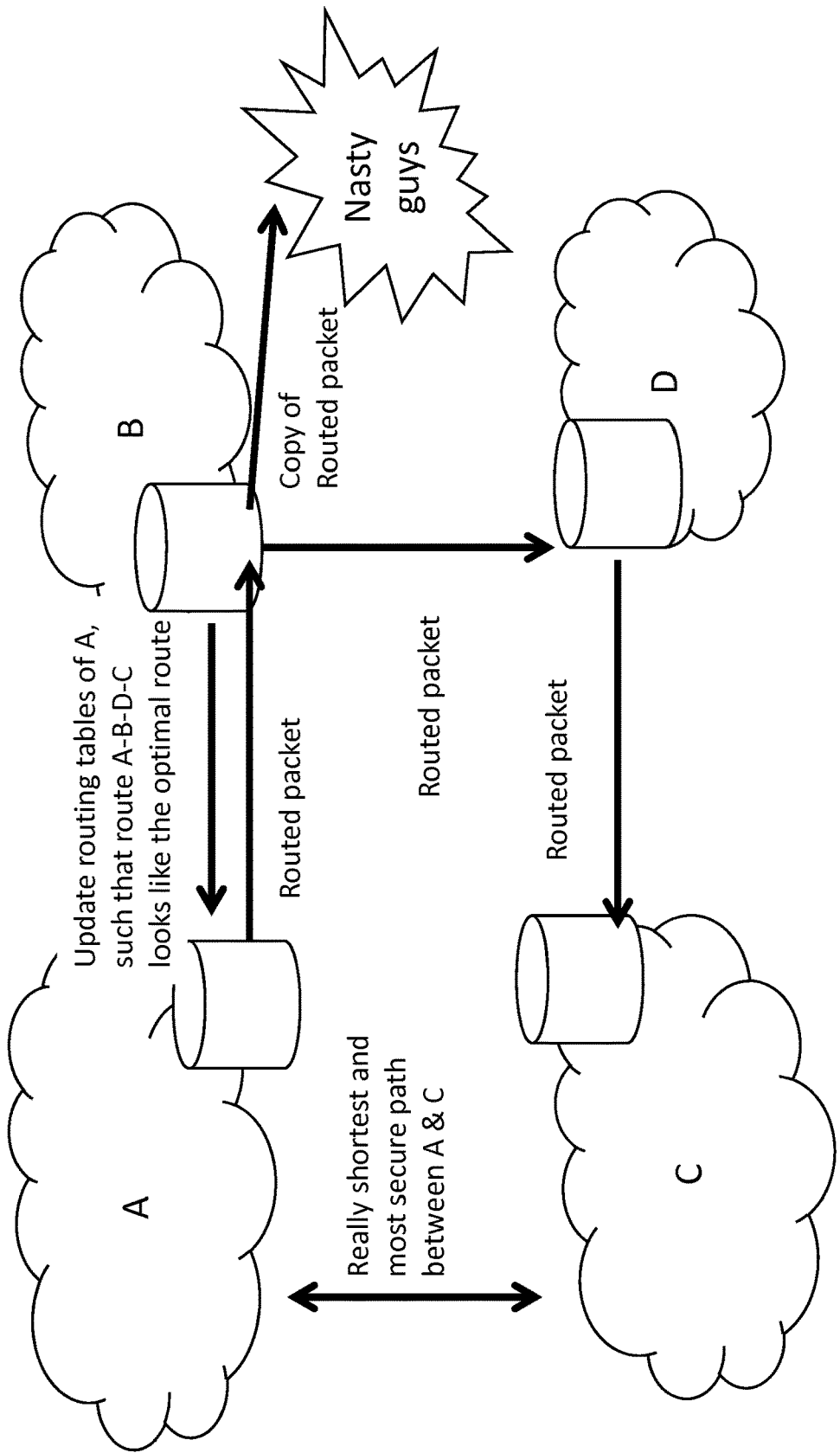
FIG. 5 shows a schematic diagram illustrating a problem with BGP according to the prior art.
Figure 6:
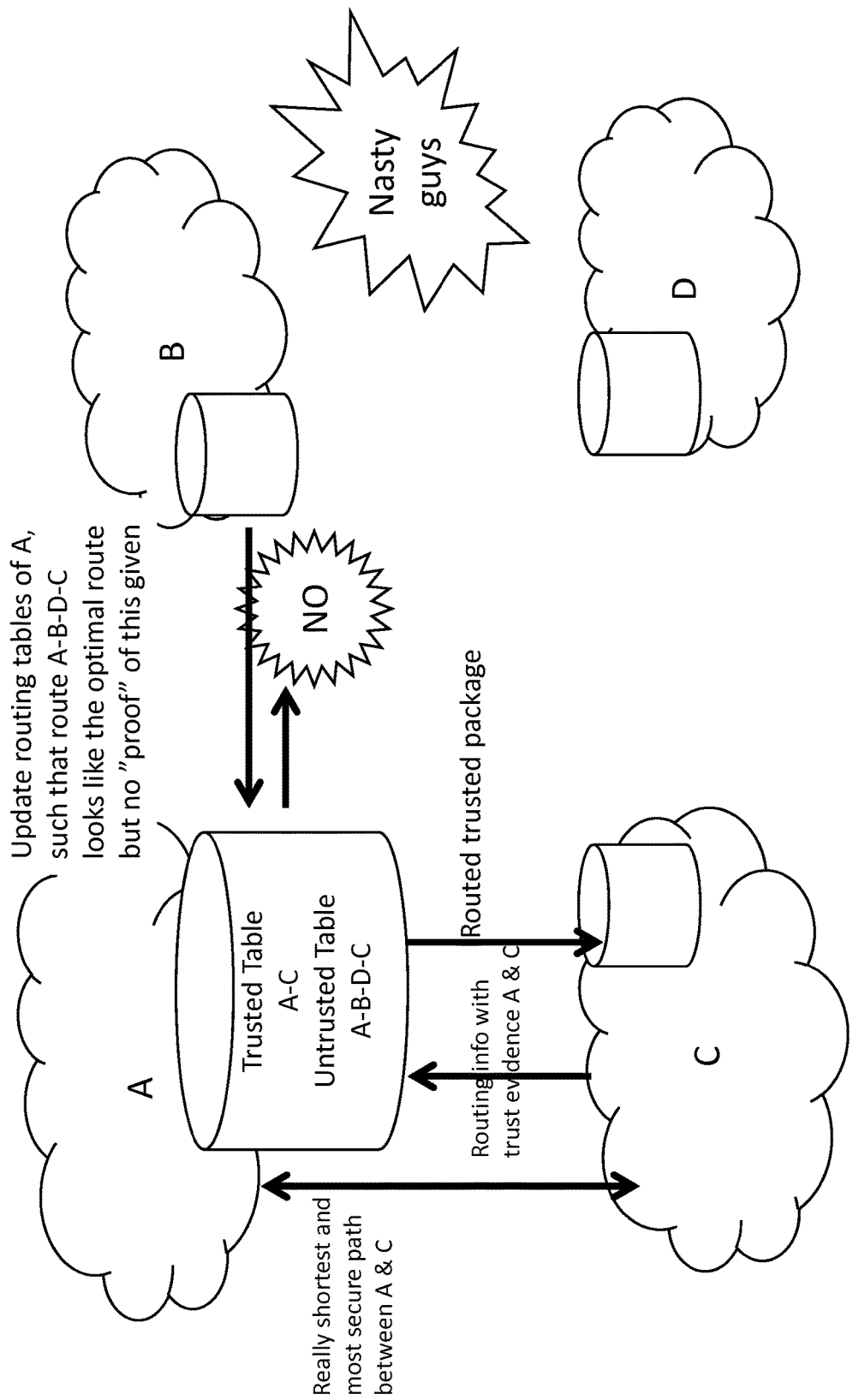
FIG. 6 shows a schematic diagram illustrating routing for trusted data packets according to an embodiment of the invention.

Finally, reference is made to FIGS. 5 and 6 for illustrating BGP problem and solution of this problem according to at least one embodiment of the invention.

FIG. 5 illustrates a system comprising four communication network systems A, B, C and D. A shortest and most secure path for routing data packets exists between A and C. However, A has received an update message from B that updates routing tables of A such that a route A-B-D-C looks like the optimal route. Hence, A routes data packets with destination C to B. Thus, "nasty guys" can get an opportunity to copy the data packets.

The above problem is solved as illustrated in FIG. 6. As shown in FIG. 6, A receives an update message from B that updates routing tables of A such that a route A-B-D-C looks like the optimal route. However, since the update message does not contain any proof that A-B-D-C is trustworthy, A stores an untrusted routing table A-B-D-C. In contrast, since A has received an update message from C indicating trust evidence between A and C, A stores a trusted routing table A-C. Thus, A routes data packets with destination C to C. Consequently, the "nasty guys" do not have a chance to copy the data packets.

Figure 2:
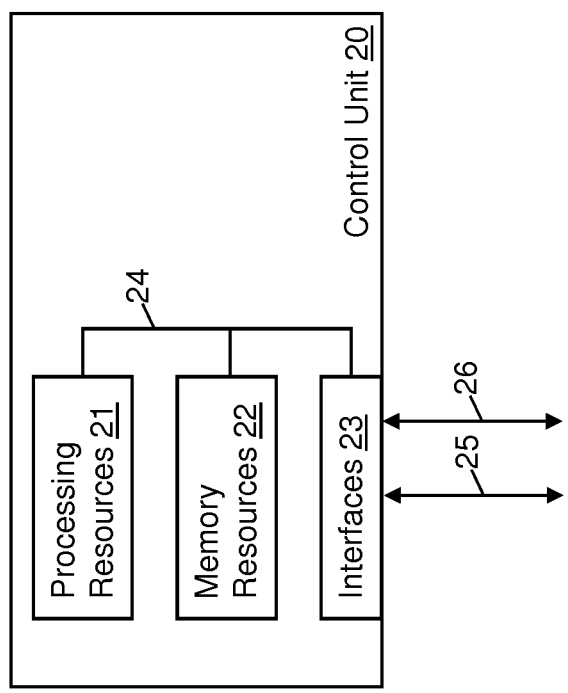
FIG. 2 shows a schematic block diagram illustrating a configuration of a control unit in which examples of embodiments of the invention are implementable.

According to an aspect of the invention, an apparatus of a communication network system is provided, which routes data packets and stores trusted routes between different communication network systems in a database. The apparatus may comprise and/or use the control unit 20 shown in FIG. 2.

The apparatus comprises means for detecting that a data packet requires a route with a specific level of trust, means for determining, from the trusted routes stored in the database, a specific trusted route towards a destination as indicated in the data packet, and means for setting the data packet on the specific trusted route towards the destination.

According to an exemplary embodiment of the invention, the apparatus comprises means for receiving, from another communication network system, security information of the other communication network system, and means for storing the security information in the database.

According to an exemplary embodiment of the invention, the apparatus comprises means for sending, to the other communication network system, security information of the communication network system.

According to an exemplary embodiment of the invention, the security information is communicated in an open message in response to an establishment of a connection between the communication network system and the other communication network system. According to another exemplary embodiment of the invention, the security information is communicated in an update message which transfers information on reachability between communication network systems.

According to an exemplary embodiment of the invention, the means for receiving receive an update message from the other communication network system, which transfers information on reachability between communication network systems, the update message including first path information from the other communication network system, that indicates whether or not a path between nodes of different communication network systems, through which routing information carried in the update message has passed, has been validated, and the means for updating update the trusted routes stored in the database based on the first path information.

According to an exemplary embodiment of the invention, the apparatus comprises means for checking whether or not the update message is signed with a key complying with the security information sent to the other communication network system, and means for, in case the checking result is negative, discarding the update message.

According to an exemplary embodiment of the invention, the update message contains at least one of the following: second path information on trustworthiness between the nodes, third path information defining an address of a router to be used as a next hop to the nodes and fourth path information defining local routing conditions, and the means for updating update the trusted routes stored in the database based on at least one of the second, third and fourth path information.

According to an exemplary embodiment of the invention, the apparatus comprises means for exchanging keep alive messages with the different communication network systems.

According to an exemplary embodiment of the invention, at least one of the open message, the update message and the keep alive message is integrity protected and signed, or individual fields of the respective message and the integrity protected message are signed.

According to an exemplary embodiment of the invention, the apparatus comprises means for including first path information into an update message which transfers information on reachability between communication network systems, the first path information indicating whether or not a path between nodes of different communication network systems, through which routing information carried in the update message has passed, has been validated. Alternatively or in addition, the means for including include, into the update message, second path information on trustworthiness between the nodes. Alternatively or in addition, the means for including include, into the update message, third path information defining an address of a router to be used as a next hop to the nodes. Alternatively or in addition, the means for including include, into the update message, fourth path information defining local routing conditions. The means for sending send the update message towards the other communication network system.

According to an exemplary embodiment of the invention, the apparatus comprises means for signing the update message with a key complying with the security information received from the other communication network system.

According to an exemplary embodiment of the invention, the address of the router is defined based on local routing conditions.

The means for detecting, determining, setting, receiving, sending, storing, updating, checking, discarding, exchanging, including and signing can be implemented by the processing resources 21, memory resources 22 and interfaces 23.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by an apparatus of a communication network system, which routes data packets and stores trusted routes between different communication network systems in a database, the method comprising:
    sending, to another communication network system, security information of the communication network system:
    receiving an update message from the other communication network system, which transfers information on reachability between communication network systems, the update message including first path information from the other communication network system, that indicates whether or not a path between nodes of different communication network systems, through which routing information carried in the update message has passed, has been validated;
    updating the trusted routes stored in the database based on the first path information:
    detecting that a data packet requires a route with a specific level of trust;
    determining, from the trusted routes stored in the database, a specific trusted route towards a destination as indicated in the data packet; and
    setting the data packet on the specific trusted route towards the destination.

2. The method of claim 1, comprising:
    receiving, from another communication network system, security information of the other communication network system; and
    storing the security information in the database.

3. The method of claim 2, wherein the security information is communicated in an open message in response to an establishment of a connection between the communication network system and the other communication network system, or
    the security information is communicated in an update message which transfers information on reachability between communication network systems.

4. The method of claim 3, wherein at least one of the open message, the update message and the keep alive message is integrity protected and signed, or individual fields of the respective message and the integrity protected message are signed.

5. The method of claim 2, comprising:
    including first path information into an update message which transfers information on reachability between communication network systems, the first path information indicating whether or not a path between nodes of different communication network systems, through which routing information carried in the update message has passed, has been validated, or including, into the update message, second path information on trustworthiness between the nodes, or including, into the update message, third path information defining an address of a router to be used as a next hop to the nodes, or including, into the update message, fourth path information defining local routing conditions;

sending the update message towards the other communication network system; and signing the update message with a key complying with the security information received from the other communication network system.

6. The method of claim 1, comprising:

checking whether or not the update message is signed with a key complying with the security information sent to the other communication network system; and in case the checking result is negative, discarding the update message.

7. The method of claim 1, wherein the update message contains at least one of the following:

second path information on trustworthiness between the nodes, third path information defining an address of a router to be used as a next hop to the nodes and fourth path information defining local routing conditions, and the method comprises:

updating the trusted routes stored in the database based on at least one of the second, third and fourth path information.

8. The method of claim 1, comprising:

exchanging keep alive messages with the different communication network systems.

9. The method of claim 1, comprising:

including first path information into an update message which transfers information on reachability between communication network systems, the first path information indicating whether or not a path between nodes of different communication network systems, through which routing information carried in the update message has passed, has been validated, or including, into the update message, second path information on trustworthiness between the nodes, or including, into the update message, third path information defining an address of a router to be used as a next hop to the nodes, or including, into the update message, fourth path information defining local routing conditions; and sending the update message towards the other communication network system.

10. The method of claim 9, wherein the address of the router is defined based on local routing conditions.

11. A computer program product embodied on a non-transitory computer-readable medium, said product including a program for a processing device, said program comprising software code portions which when the program is run on the processing device performs the steps of sending by a communication network system, to another communication network system, security information of the communication network system;

receiving an update message from the other communication network system, which transfers information on reachability between communication network systems, the update message including first path information from the other communication network system, that indicates whether or not a path between nodes of different communication network systems, through which routing information carried in the update message has passed has been validated;

updating the trusted routes stored in a database based on the first path information;

detecting that a data packet requires a route with a specific level of trust;

determining, from the trusted routes stored in the database, a specific trusted route towards a destination as indicated in the data packet; and setting the data packet on the specific trusted route towards the destination.

12. The computer program product according to claim 11, wherein the program is directly loadable into an internal memory of the processing device.

13. An apparatus of a communication network system, which is configured to route data packets and store trusted routes between different communication network systems in a database, the apparatus comprising:

at least one processor, and at least one memory including computer program code, wherein the at least one memory and the computer program code are configured to, with the at least one processor, cause the apparatus at least to perform sending security information of the communication network system to another communication network system;

receiving an update message from the other communication network system, which transfers information on reachability between communication network systems, the update message including first path information from the other communication network system, that indicates whether or not a path between nodes of different communication network systems, through which routing information carried in the update message has passed, has been validated;

updating the trusted routes stored in the database based on the first path information;

detecting that a data packet requires a route with a specific level of trust;

determining, from the trusted routes stored in the database, a specific trusted route towards a destination as indicated in the data packet; and setting the data packet on the specific trusted route towards the destination.

14. The apparatus of claim 13, wherein the at least one memory and the computer program code are configured to, with the at least one processor, cause the apparatus to further perform:

receiving, from another communication network system, security information of the other communication network system; and storing the security information in the database.

15. The apparatus of claim 14, wherein the at least one memory and the computer program code are configured to, with the at least one processor, cause the apparatus to further perform:

including first path information into an update message which transfers information on reachability between communication network systems, the first path information indicating whether or not a path between nodes of different communication network systems, through which routing information carried in the update message has passed, has been validated, or including, into the update message, second path information on trustworthiness between the nodes, or including, into the update message, third path information defining an address of a router to be used as a next hop to the nodes, or including, into the update message, fourth path information defining local routing conditions; and sending the update message towards the other communication network system; and signing the update message with a key complying with the security information received from the other communication network system.

16. The apparatus of claim 13, wherein the at least one memory and the computer program code are configured to, with the at least one processor, cause the apparatus to further perform:

checking whether or not the update message is signed with a key complying with the security information sent to the other communication network system; and in case the checking result is negative, discarding the update message.

17. The apparatus of claim 13, wherein the update message contains at least one of the following:

second path information on trustworthiness between the nodes, third path information defining an address of a router to be used as a next hop to the nodes and fourth path information defining local routing conditions, wherein the at least one memory and the computer program code are configured to, with the at least one processor, cause the apparatus to perform:

updating the trusted routes stored in the database based on at least one of the second, third and fourth path information.

18. The apparatus of claim 13, wherein the at least one memory and the computer program code are configured to, with the at least one processor, cause the apparatus to further perform:

exchanging keep alive messages with the different communication network systems.

19. The apparatus of claim 13, wherein the at least one memory and the computer program code are configured to, with the at least one processor, cause the apparatus to further perform:

including first path information into an update message which transfers information on reachability between communication network systems, the first path information indicating whether or not a path between nodes of different communication network systems, through which routing information carried in the update message has passed, has been validated, or including, into the update message, second path information on trustworthiness between the nodes, or including, into the update message, third path information defining an address of a router to be used as a next hop to the nodes, or including, into the update message, fourth path information defining local routing conditions; and sending the update message towards the other communication network system.

* * * * *